Patented Jan. 2, 1951

2,536,438

UNITED STATES PATENT OFFICE 2,536,438

SEMISOLID FOOD PRODUCT AND PROCESS FOR MAKING THE SAME

William Peter Martin Grelck, Baltimore, Md.

No Drawing. Application December 10, 1948, Serial No. 64,701

2 Claims. (Cl. 99—2)

My invention relates to a wet food product in which the principal ingredients are the solids from fresh or lacto-fermented whey, a by-product from the manufacture of curd or cheese, with other ingredients added such as semi-solid brewers yeast, dried skim milk or buttermilk. The semi-solid brewers yeast is incorporated for the purpose of enriching the food product with the natural vitamines of the "B" complex and of its large content of amino acids. A quantity of water is added and so proportioned in the processing that the final product is of semi-solid consistency, characterized by great uniformity and smoothness. A product of this nature is urgently needed in animal production, especially in poultry feeding, because the feed products at the present time on the market are of great variation in respect to consistency, smoothness and uniformity, they are mostly too hard or too soft, solid matter separates from juicy part of its content, but the main objection to these products is the variation of the size of the crystals of the sugar of milk content, ranging in size from one-sixteenth to one-eighth of an inch in diameter, therefore causes uneven absorption of the supernatant fluid, makes the product either thin, sloppy or stiff, hard and so inconvenient to handle. In such semi-solid products the total solids range from fifty-five to sixty per cent. Poultry producers object to use such semi-solid products of uneven consistency, they cause considerable waste and thus become costly to use.

The object of my invention is to eliminate these objectionable features caused by the non-uniform crystallization of the sugar of milk in semi-solid food products from concentrated whey as its principal ingredient, the average content of sugar of milk in such products is usually over thirty per cent and insufficient water is available to keep the sugar of milk in solution and therefore non-uniform crystallization of it takes place. One-half of the total solids are approximately made up from whey, the remainder is made up in solids from the added semi-solid brewers yeast, dried skim-milk or buttermilk, or both, and water. To produce a homogeneous semi-solid food product in which the crystals of the sugar of milk are in finely divided form of permanent character and stabilized, I dry the required amount of whey by either the spray process or the roller-drum dryer process, grind the dried whey to a flour like fineness and so obtain sugar of milk in an inert form. The so prepared dried whey is then added to the required amount of water of suitable temperature together with the semi-solid brewers yeast, dried skim milk or dried buttermilk or both, the mass is thoroughly mixed in a suitable container fitted with stirrer and jacket for heating or cooling, preferably a coil vat such as used in the dairy industry for heating or cooling milk or cream. I find that the food compound processed in this manner is of permanent uniform semi-solid consistency, of great smoothness and free from separation of supernatant fluid and rich in the vitamines of the "B" complex.

Other objects of this invention will in part be obvious and will in part appear hereafter.

The invention accordingly comprises the several steps and the relation of one or more such steps with respect to each of the others, and the product possessing the features, properties, and the relation of constituents, which are exemplified in the following detailed disclosure, and the scope of the application of which will be indicated in the claims. In practicing my invention I prefer to proceed as follows: To make one thousand pounds of this food product in semi-solid form, the first step consists in drying of approximately eight thousand pounds of fresh or lacto-fermented whey by either the spray or rotary drum dryer process, the yield of dry whey is approximately four hundred and sixty pounds in which when finely ground the sugar of milk content averages seventy per cent, and is in a stabilized or inert form of permanent character in minutely divided particles. The second step consists in placing into a suitable container fitted with stirrer and jacket for heating and cooling such as a coil vat, used for heating and cooling milk or cream, the required amount of water, in this case three hundred sixty five pounds, heating the water to approximately one hundred seventy five degrees Fahrenheit, while the agitator is in motion continually, then adding the previously dried whey of four hundred sixty pounds slowly under constant stirring, then adding slowly to the mass one hundred fifty pounds of semi-solid brewers yeast, which contains about forty per cent total solids, then adding twenty pounds of dried butter milk, the mass being constantly stirred becomes of a heavy cream like consistency and is further agitated until a homogeneous, smooth mixture is obtained. The so processed food product is then cooled and filled into suitable containers with airtight closure, to be sold as a food.

Since certain changes in carrying out the above described process, and certain modifications in the product which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A method of producing a food product of semi-solid consistency in which the sugar of milk content is free from active crystals of the same comprises, the grinding of the previously dried whey as the principal ingredient to a flour like powder, to which the required amount of dried non-fatty milk solids are added together with semi-solid brewers yeast and the addition of water is so timed that the finished product contains an average sixty per cent total solids, the mass is thoroughly mixed in a suitable mixer to a smooth, homogeneous consistency at normal temperature, then packed in airtight containers.

2. A semi-solid food product free from active crystals of sugar of milk, having as its principal ingredient dried whey in powder form including the dried non-fatty solids of milk, semi-solid brewers yeast and water, making up the solid content to average sixty per cent and the moisture content forty per cent.

WILLIAM PETER MARTIN GRELCK.

REFERENCES CITED

The following references are of record in the file of this patent:

UNITED STATES PATENTS

| Number | Name | Date |
| --- | --- | --- |
| 2,235,613 | Grelck | Mar. 18, 1941 |
| 2,279,106 | Brown | Apr. 7, 1942 |
| 2,450,318 | Wagamon | Sept. 28, 1948 |

FOREIGN PATENTS

| Number | Country | Date |
| --- | --- | --- |
| 232,667 | Great Britain | of 1925 |